(12) United States Patent
Yamaoka et al.

(10) Patent No.: US 11,691,461 B2
(45) Date of Patent: *Jul. 4, 2023

(54) TYRE

(71) Applicant: SUMITOMO RUBBER INDUSTRIES, LTD., Hyogo (JP)

(72) Inventors: Hiroshi Yamaoka, Hyogo (JP); Koichi Nakajima, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 398 days.

This patent is subject to a terminal disclaimer.

(21) Appl. No.: 16/865,845

(22) Filed: May 4, 2020

(65) Prior Publication Data

US 2020/0376900 A1 Dec. 3, 2020

(30) Foreign Application Priority Data

May 31, 2019 (JP) .................. 2019-102093

(51) Int. Cl.
*B60C 11/13* (2006.01)
*B60C 11/03* (2006.01)
*B60C 11/12* (2006.01)

(52) U.S. Cl.
CPC ...... *B60C 11/1353* (2013.01); *B60C 11/0304* (2013.01); *B60C 11/1236* (2013.01); *B60C 2011/1361* (2013.01)

(58) Field of Classification Search
CPC ............. B60C 11/1353; B60C 11/1369; B60C 11/047; B60C 2011/1361
See application file for complete search history.

(56) References Cited

U.S. PATENT DOCUMENTS 3,773,283 A  11/1973 Abplanalp
6,415,835 B1  7/2002 Heinen
(Continued)

FOREIGN PATENT DOCUMENTS

EP  2985157 A1  2/2016
EP  3501852 A1  6/2019
(Continued)

OTHER PUBLICATIONS

English machine translation of JP H07-276920. (Year: 1995).*
European Search Report, European Patent Office, Application No. 20164896.1, dated Jul. 22, 2020.

Primary Examiner — Robert C Dye
(74) Attorney, Agent, or Firm — Greenblum & Bernstein, P.L.C.

(57) ABSTRACT

A tyre includes a tread portion provided with a circumferential groove and a lateral groove. The at least one lateral groove includes a connected portion connected to the circumferential groove. The circumferential groove includes a groove bottom provided with groove bottom protruding portions protruding outwardly in the tyre radial direction. Each groove bottom protruding portion includes a first surface portion extending in the tyre radial direction and facing a first circumferential direction, and a second surface portion arranged on a second circumferential direction opposite to the first circumferential direction and extending at a larger angle with respect to the tyre radial direction than that of the first surface portion. In a tread plan view, at least a part of the groove bottom protruding portions is located in a lateral-groove extended region in which the connected portion is extended into the circumferential groove along the tyre axial direction.

18 Claims, 4 Drawing Sheets

(56) References Cited

U.S. PATENT DOCUMENTS

| | | | |
|---|---|---|---|
| 2003/0111150 A1* | 6/2003 | Zimmer | B60C 11/00 |
| | | | 152/209.19 |
| 2007/0056665 A1 | 3/2007 | Parmentier | |
| 2009/0194212 A1* | 8/2009 | Bonko | B60C 11/1353 |
| | | | 152/209.21 |
| 2016/0297251 A1 | 10/2016 | Takagi et al. | |
| 2019/0359008 A1* | 11/2019 | Nakajima | B60C 11/047 |

FOREIGN PATENT DOCUMENTS

| | | | |
|---|---|---|---|
| JP | H07-276920 | * | 10/1995 |
| JP | H07276920 A | | 10/1995 |
| JP | 2002-036820 | * | 6/2002 |
| JP | 2015-160605 A | | 9/2015 |

* cited by examiner

TYRE

BACKGROUND ART

Field of the Disclosure

The present disclosure relates tyres, more particularly to a tyre including a tread portion provided with a circumferential groove extending continuously in the tyre circumferential direction.

Description of the Related Art

The following Patent document 1 discloses a tyre including a tread portion provided with a circumferential groove extending continuously in the tyre circumferential direction. The circumferential groove includes first groove portions and second groove portions having a groove width greater than that of the first groove portions. The circumferential groove disclosed in Patent document 1 expects to improve snow shearing force.

PATENT DOCUMENT

[Patent document 1] Japanese Unexamined Patent Application publication 2015-160605

SUMMARY OF THE DISCLOSURE

Although the pneumatic tyre of Patent Document 1 is expected to improve performance on snow, in recent years, higher performance on snow has been required.

The present disclosure has been made in view of the above circumstances, and has a major object to provide a tyre capable of exerting superior performance on snow.

According to one aspect of the disclosure, a tyre includes a tread portion being provided with at least one circumferential groove extending continuously in a tyre circumferential direction and at least one lateral groove extending in a tyre axial direction, the at least one lateral groove including a connected portion connected to the circumferential groove, the at least one circumferential groove including a groove bottom, the groove bottom being provided with a plurality of groove bottom protruding portions protruding outwardly in a tyre radial direction, each of the plurality of groove bottom protruding portions including a first surface portion extending in the tyre radial direction and facing a first circumferential direction, and a second surface portion arranged on a second circumferential direction opposite to the first circumferential direction and extending at a larger angle with respect to the tyre radial direction than that of the first surface portion, wherein in a tread plan view, at least a part of the plurality of groove bottom protruding portions is located in a lateral-groove extended region in which the connected portion is extended into the at least one circumferential groove along the tyre axial direction.

In another aspect of the present disclosure, in each of the plurality of groove bottom protruding portions, the first surface portion may be continuous with the second surface portion.

In another aspect of the present disclosure, the first surface portion may be continuous with the second surface portion through a ridge line extending in the tyre axial direction.

In another aspect of the present disclosure, in each of the plurality of groove bottom protruding portions, an angle between the first surface portion and the second surface portion may be an acute angle.

In another aspect of the present disclosure, the groove bottom may be provided with flat portions between the plurality of groove bottom protruding portions, and the flat portions extend along a ground contacting surface of the tread portion.

In another aspect of the present disclosure, the at least one lateral groove may include a plurality of lateral grooves arranged in the tyre circumferential direction, and an arrangement pitch of the plurality of groove bottom protruding portions in the tyre circumferential direction may be smaller than an arrangement pitch of the plurality of lateral grooves.

In another aspect of the present disclosure, at least a part of the first surface portion of one of the plurality of groove bottom protruding portions may be located in the lateral-groove extended region.

In another aspect of the present disclosure, the plurality of groove bottom protruding portions may include a plurality of first groove bottom protruding portions located on a first side in a groove width direction of the at least one circumferential groove, and a plurality of second groove bottom protruding portions located on a second side opposite to the first side in the groove width direction of the at least one circumferential groove.

In another aspect of the present disclosure, the second surface portions of the plurality of first groove bottom protruding portions may be inclined in an opposite direction to the second surface portions of the plurality of second groove bottom protruding portions.

In another aspect of the present disclosure, the at least one lateral groove may include at least one first lateral groove connected to the at least one circumferential groove on the first side, and at least one second lateral grooves connected to the at least one circumferential groove on the second side, at least a part of the plurality of first groove bottom protruding portions may be located in the lateral-groove extended region of the at least one first lateral groove, and at least a part of the plurality of second groove bottom protruding portions may be located in the lateral-groove extended region of the at least one second lateral groove.

In another aspect of the present disclosure, the lateral-groove extended region of the at least one second lateral groove may overlap the lateral-groove extended region of the at least one first lateral groove.

DESCRIPTION OF THE PREFERRED EMBODIMENTS

An embodiment of the present disclosure will be explained below with reference to the accompanying drawings.

Figure 1:
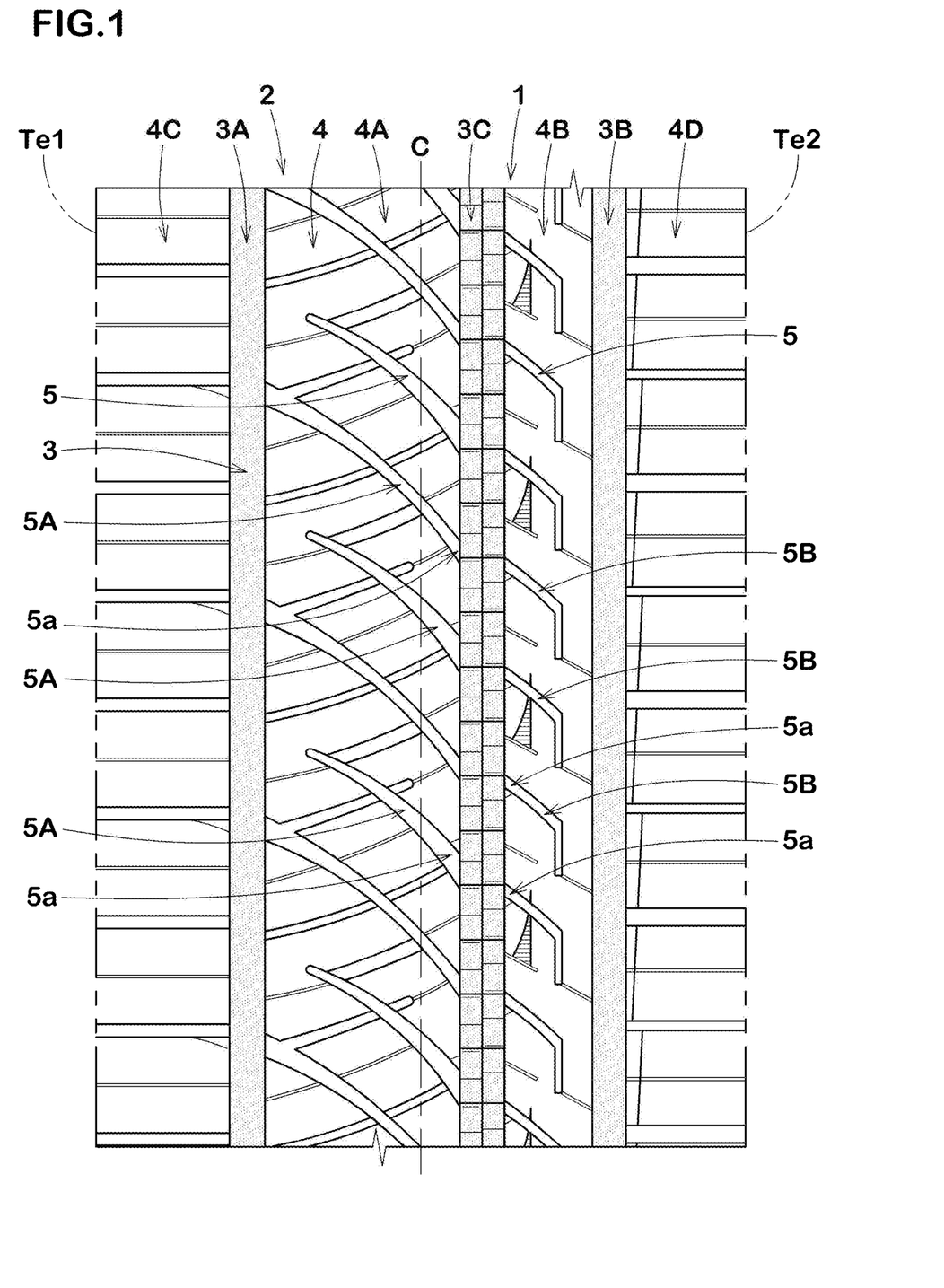
FIG. 1 is a development view of a tread portion of a tyre according to an embodiment of the disclosure.

FIG. 1 is a development view of a tread portion 2 of a tyre 1 according to an embodiment of the disclosure.

The tyre 1 according to the present embodiment, for example, is suitably used for a pneumatic tyre for passenger car. Note that the present disclosure is not limited to such an aspect, but can be embodied as a pneumatic tyre for heavy duty vehicle, and a non-pneumatic tyre which can structurally support the tyre load without being inflated with a compressed air, for example.

As illustrated in FIG. 1, the tyre 1 according to the present embodiment includes the tread portion 2 having a designated mounting direction to a vehicle. According to the mounting direction, the tread portion 2 includes a first tread edge Te1 and a second tread edge Te2 which are respectively intended to be located outwardly and inwardly of a vehicle upon being mounted to the vehicle. The mounting direction, for example, may be indicated on a sidewall portion (not illustrated) using characters or symbol.

When the tyre 1 is a pneumatic tyre, the first tread edge Te1 and the second tread edge Te2 are defined as axially outermost edges of the ground contacting patch of the tread portion 2 which occurs when the tyre 1 prepared under a normal state is grounded on a plane at zero camber angle with a standard tyre load.

As used herein, the "normal state" is such that the tyre 1 is mounted on a standard wheel rim with a standard pressure but loaded with no tyre load. As used herein, unless otherwise noted, dimensions of respective portions of the tyre 1 are values measured under the normal state.

The "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

The "standard pressure" is a standard pressure officially approved for each tyre by standards organizations on which the tyre is based, wherein the standard pressure is the "maximum air pressure" in JATMA, the maximum pressure given in the "Tyre Load Limits at Various Cold Inflation Pressures" table in TRA, and the "Inflation Pressure" in ETRTO, for example.

The "standard tyre load" is a tyre load officially approved for each tyre by standards organizations in which the tyre is based, wherein the standard tyre load is the "maximum load capacity" in JATMA, the maximum value given in the above-mentioned table in TRA, the "Load Capacity" in ETRTO, for example.

In the present embodiment, the tread portion 2, for example, is provided with three circumferential grooves 3 extending continuously in the tyre circumferential direction to divide a region between the first tread edge Te1 and the second tread edge Te2 into four land portions 4. In order to help understanding the present disclosure, the circumferential grooves 3 are colored in FIG. 1. Further, the land portions 4 are provided with a plurality of lateral grooves 5.

The circumferential grooves 3 include a first shoulder circumferential groove 3A disposed between the first tread edge Te1 and the tyre equator C, a second shoulder circumferential groove 3B disposed between the second tread edge Te2 and the tyre equator C, and a crown circumferential groove 3C disposed between the first shoulder circumferential groove 3A and the second shoulder circumferential groove 3B. The land portions 4 include a first middle land portion 4A, a second middle land portion 4B, a first shoulder land portion 4C, and a second shoulder land portion 4D. The first middle land portion 4A is defined between the first shoulder circumferential groove 3A and the crown circumferential groove 3C. The second middle land portion 4B is defined between the second shoulder circumferential groove 3B and the crown circumferential groove 3C. The first shoulder land portion 4C is defined between the first shoulder circumferential groove 3A and the first tread edge Te1. The second shoulder land portion 4D is defined between the second shoulder circumferential groove 3B and the second tread edge Te2.

Figure 2:
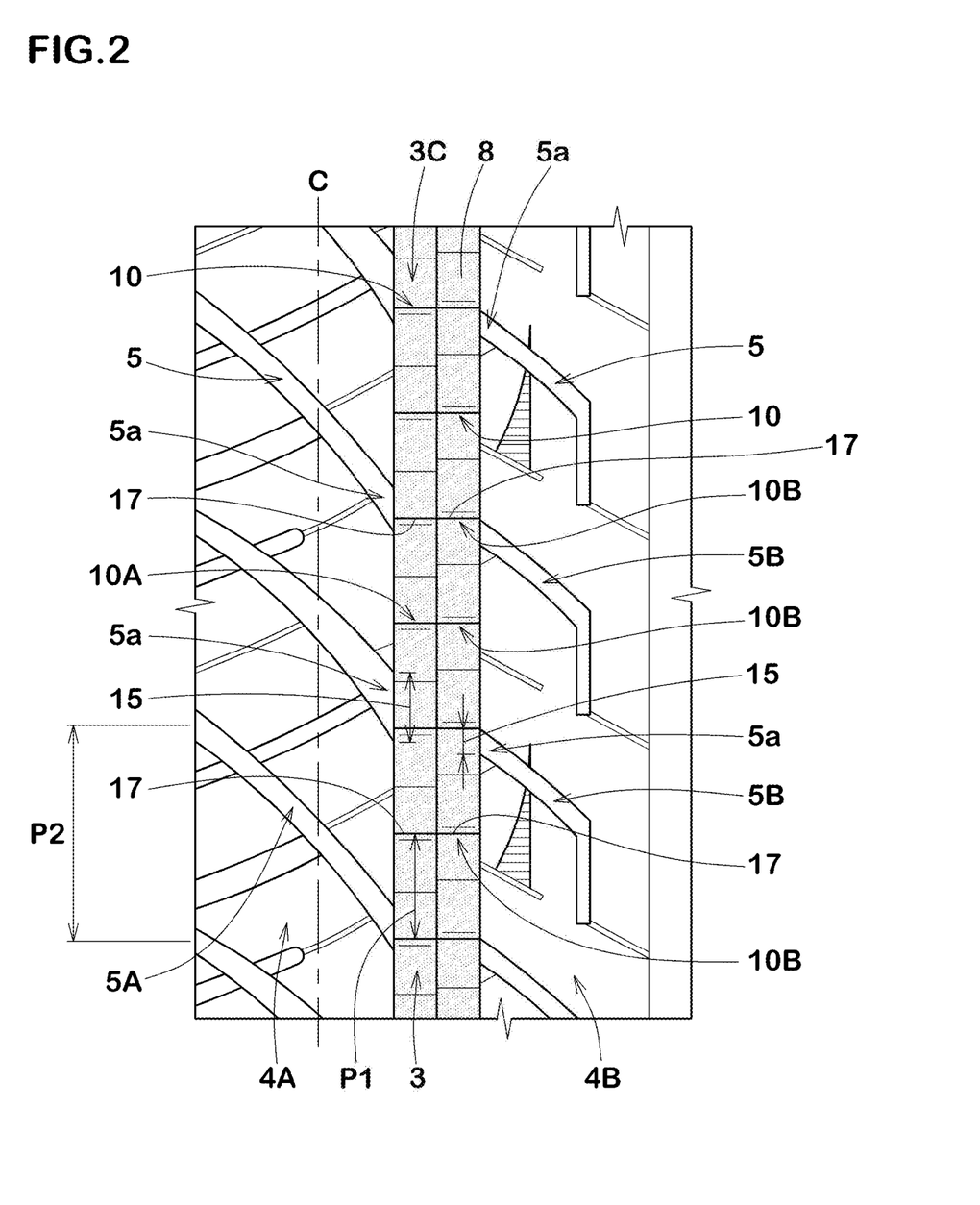
FIG. 2 is an enlarged view of a circumferential groove of FIG. 1.
Figure 3:
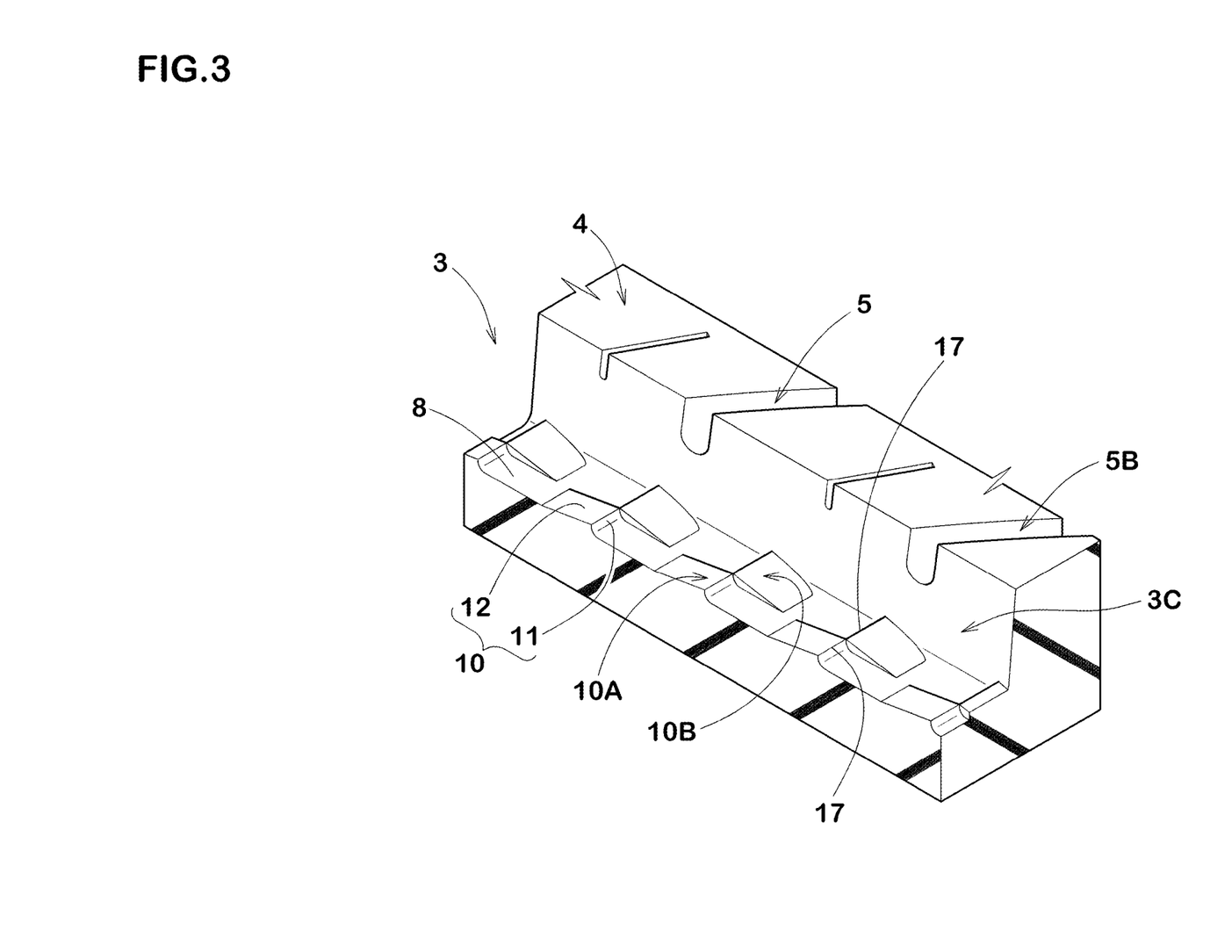
FIG. 3 is a perspective view of the circumferential groove of FIG. 2.

In FIG. 2, as a figure showing an embodiment of one of the circumferential grooves 3, an enlarged view of the crown circumferential groove 3C is illustrated. FIG. 3 illustrates an enlarged perspective view of one of the circumferential grooves 3 (e.g. the crown circumferential groove 3C). As illustrated in FIG. 2 and FIG. 3, the circumferential groove 3 includes a groove bottom 8, and the groove bottom 8 is provided with a plurality of groove bottom protruding portions 10 protruding outwardly in the tyre radial direction. Note that to help understanding the present disclosure, in FIG. 1 and FIG. 2, outlines of the groove bottom protruding portions 10 are shown on the groove bottom 8 of the circumferential groove 3.

As illustrated in FIG. 3, each of the groove bottom protruding portions 10 includes a first surface portion 11 extending in the tyre radial direction and facing a first circumferential direction, and a second surface portion 12 arranged on a second circumferential direction opposite to the first circumferential direction and having a larger angle with respect to the tyre radial direction than that of the first surface portion 11.

The circumferential groove 3, when driving on snow, can form a compressed snow column on the ground, and then the groove bottom protruding portions 10 can engage the snow column to enhance traction and braking force. Additionally, in each of the groove bottom protruding portions 10, since the second surface portion 12, with respect to the tyre radial direction, has a larger angle than that of the first surface portion 11, the second surface portion 12 can prevent deflecting of the groove bottom protruding portion 10 in the tyre circumferential direction so that the first surface portion 11 can engage the snow column firmly. Thus, the groove bottom protruding portions 10 can generate powerful snow traction.

Furthermore, the above-mentioned groove bottom protruding portions 10, when driving on dry road conditions, can disturb air flowing the circumferential groove 3, resulting in reducing the air column resonance sound to be generated in the circumferential groove 3.

As illustrated in FIG. 2, the lateral grooves 5 include connected portions 5a connected to the circumferential groove 3 (e.g. the crown circumferential groove 3C). In the present disclosure, in a tread plan view, at least a part of one of the groove bottom protruding portions 10 is located in either one of the lateral-groove extended regions 15. As used herein, the lateral-groove extended regions 15 are regions in which the respective connected portions 5a are extended into the circumferential groove 3 along (e.g. parallel to) the tyre axial direction. Preferably, in the respective lateral-groove extended regions 15, either one of the respective groove bottom protruding portions 10, at least partially, is located. When driving on snow, the lateral grooves 5 when coming into contact with the ground compress snow, and then the compressed snow tends to move into the lateral-groove extended regions 15 of the circumferential groove 3. The movement of snow can increase compression force of the snow in the lateral-groove extended regions 15, resulting in improving engagement of the groove bottom protruding portions 10 and the snow column. Thus, more powerful snow traction can be generated, and the performance on snow can further be improved.

Figure 4:
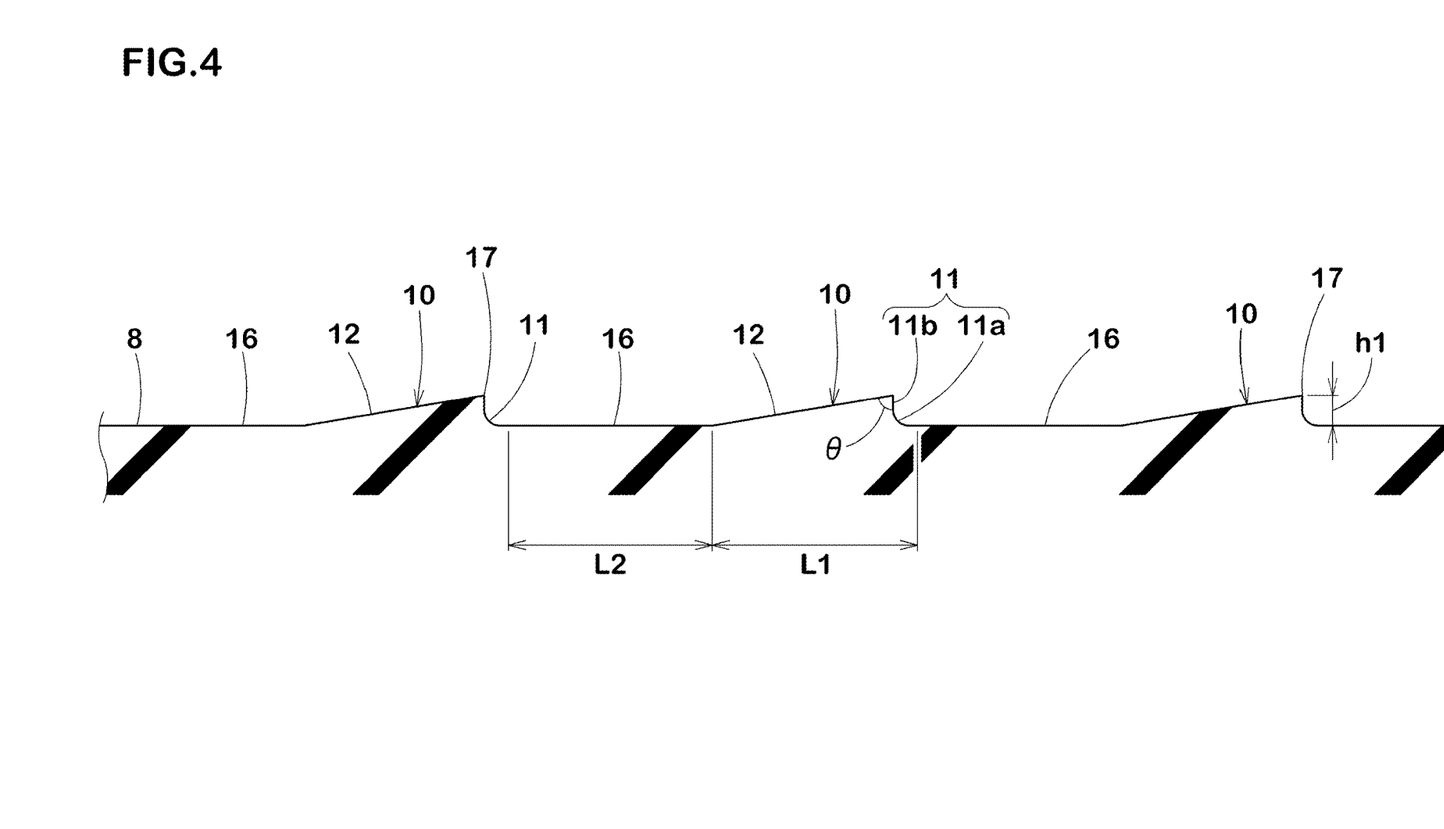
FIG. 4 is a cross-sectional view of a plurality of groove bottom protruding portions along the tyre circumferential direction.

FIG. 4 illustrates a cross-sectional view of a plurality of groove bottom protruding portions 10 along the tyre circumferential direction. As illustrated in FIG. 4, the groove bottom 8 is provided with flat portions 16 between the plurality of groove bottom protruding portions 10. The flat portions 16 extend along (e.g. parallel to) a ground contacting surface of the tread portion 2. This structure can prevent that snow clog in the circumferential groove 3, ensuring superior driving performance on snow in a long term.

For example, each of the groove bottom protruding portions 10 has a length L1 in the tyre circumferential direction in a range of 0.80 to 1.20 times a length L2 in the tyre circumferential direction of each of the flat portions 16.

When a height h1 of each of the groove bottom protruding portions 10 becomes small, an improvement of driving performance on snow may not be expected. When the height h1 becomes too high, wet performance may be deteriorated. From these viewpoints, the height h1 of each of the groove bottom protruding portions 10 is preferably equal to or more than 0.5 mm, more preferably equal to or more than 1.0 mm, but preferably equal to or less than 2.0 mm, more preferably equal to or less than 1.6 mm.

In each of the groove bottom protruding portions 10, it is preferable that the first surface portion 11 and the second surface portion 12 are continuous. In the present embodiment, the first surface portion 11 and the second surface portion 12 are continuous through a ridge line 17 extending in the tyre axial direction. Such groove bottom protruding portions 10 can prevent reduction in groove volume, improving driving performance on snow while ensuring wet performance.

In a tread plan view as shown in FIG. 2, the ridge line 17, for example, has an angle equal to or less than 15 degrees, more preferably equal to or less than 5 degrees with respect to the tyre axial direction. In more preferred aspects, the ridge line 17 according to the present embodiment extends in parallel with the tyre axial direction.

As illustrated in FIG. 4, in each of the groove bottom protruding portions 10, an angle θ between the first surface portion 11 and the second surface portion 12, for example, is in a range of 80 to 110 degrees. In the present embodiment, the first surface portion 11, for example, crosses the second surface portion 12 directly at an angle of 80 to 110 degrees. In some preferred aspects, the angle θ between the first surface portion 11 and the second surface portion 12 is an acute angle. Thus, when driving on snow, the ridge line 17 of each of the groove bottom protruding portions 10 can engage with and scratch the snow column in the circumferential groove 3, generating powerful snow traction. In another aspect, the first surface portion 11, for example, may be connected to the second surface portion 12 through a rounded chamfered portion (not illustrated).

Each first surface portion 11, for example, includes a curved face region 11a extending from one of the flat portions 16 and a flat face region 11b located between the curved face region 11a and the ridge line 17.

Each second surface portion 12, for example, extends from one of the flat portions 16 to the ridge line 17 at an angle of 5 to 15 degrees with respect to the tyre circumferential direction. Thus, while ensuring groove volume of the circumferential groove 3, deflection of each groove bottom protruding portion 10 in the tyre circumferential direction can be suppressed, and superior driving performance on snow can be obtained.

As illustrated in FIG. 3, in the present embodiment, the groove bottom protruding portions 10 include a plurality of first groove bottom protruding portions 10A located on a first side in a groove width direction of the circumferential groove 3, and a plurality of second groove bottom protruding portions 10B located on a second side in the groove width direction of the circumferential groove 3.

The first surface portions 11 of the first groove bottom protruding portions 10A face the first circumferential direction, and the first surface portions 11 of the second groove bottom protruding portions 10B face the second circumferential direction. Additionally, the second surface portions 12 of the first groove bottom protruding portions 10A are inclined in an opposite direction to the second surface portions 12 of the second groove bottom protruding portions 10B. Note that the structure of the groove bottom protruding portions 10 as described above is applied to the first groove bottom protruding portions 10A and the second groove bottom protruding portions 10B. The first groove bottom protruding portions 10A and the second groove bottom protruding portions 10B as such can improve snow traction and braking force. Additionally, the first groove bottom protruding portions 10A and the second groove bottom protruding portions 10B, when driving on dry road conditions, can disturb air flowing the circumferential groove 3. Preferably, the respective ridge lines 17 of the plurality of first groove bottom protruding portions 10A are aligned with the respective ridge lines 17 of the plurality of second groove bottom protruding portions 10B as shown in FIGS. 2 and 3. Preferably, the respective aligned ridge lines 17 of the plurality of first groove bottom protruding portions 10A and the plurality of second groove bottom protruding portions 10B, in a tread plan view, extend over an entire length of the circumferential groove 3 as shown in FIGS. 2 and 3.

As illustrated in FIG. 2, an arrangement pitch P1 of the plurality of groove bottom protruding portions 10 in the tyre circumferential direction is smaller than an arrangement pitch P2 of the plurality of lateral grooves 5. In the present embodiment, the arrangement pitch P1 is in a range of 0.40 to 0.60 times the arrangement pitch P2.

Preferably, in each of the lateral-groove extended regions 15, at least a part of the first surface portion 11 of either one of the groove bottom protruding portions 10 is located. Thus, driving performance on snow can be improved further.

In the lateral-groove extended regions of the first lateral grooves 5A, at least a part of either one of the first groove bottom protruding portions 10A are located. In the lateral-groove extended region 15 of the second lateral grooves 5B, at least a part of either one of the second groove bottom protruding portions 10B are located. Such a layout of the first groove bottom protruding portions 10A and the second groove bottom protruding portions 10B can help to improve snow traction and braking performance in a well-balanced manner.

In some preferred aspects, the respective lateral-groove extended regions 15 of the second lateral grooves 5B overlap the respective lateral-groove extended regions 15 of the first lateral grooves 5A. Thus, snow in the circumferential groove 3 can be compressed firmly, the above-mentioned effects can further be improved.

As illustrated in FIG. 1, in the present embodiment, the above-mentioned groove bottom protruding portions 10 are provided on only the crown circumferential groove 3C, and are not provided on the other circumferential grooves 3. Thus, driving performance on snow and wet performance can be improved in a well-balanced manner. Note that the present disclosure is not limited to such an aspect, but may be modified in such a way that the groove bottom protruding portions 10 are provided on all circumferential groove 3. This aspect can improve driving performance on snow of the tyre 1.

While the particularly preferred embodiments in accordance with the disclosure have been described in detail above, the present disclosure is not limited to the above embodiments but can be modified and carried out in various aspects within the scope of the disclosure.

EXAMPLE

Tyres, 215/60R16, having a basic pattern of FIG. 1 were prototyped based on the specification shown in Table 1. As a comparative example, a tyre having no groove bottom protruding portions on the circumferential grooves was also prototyped. Note that the comparative example tyre has the same tread pattern as the tread pattern shown in FIG. 1, except for the above-mentioned structure. Then, on-snow performance, wet performance and noise performance of each test tyre was tested. The common specification of the tyres are as follows:
  rim size: 16×6.5:
  tyre inner pressure: 240 kPa;
  test vehicle: front-wheel-drive vehicle with displacement of 2500 cc: and
  tyre mounting location: all wheel. The test methods are as follows.
On-Snow Performance Test:

The performance of the test vehicle on a snowy road was evaluated based on the driver's feeling. The results are indicated using a score where the comparative example as set to 100. The larger the numerical value, the better the performance on snow.
Wet Performance Test:

The performance of the test vehicle on a wet road was evaluated based on the driver's feeling. The results are indicated using a score where the comparative example as set to 100. The larger the numerical value, the better the performance on wet.
Noise Performance Test:

The test vehicle was driven on a dry road at 40 to 100 km/h, and the maximum sound pressure of the noise was measured. The results are indicated using an index where the sound pressure of the comparative example as set to 100. The smaller the numerical value, the smaller the noise during running and the higher the noise performance.

Table 1 shows the test results.

As a result of the test, it is confirmed that the example tyres exert superior on-snow performance. Additionally, it is also confirmed that the example tyres improve noise performance while maintaining wet performance.

What is claimed is:

1. A tire comprising:
a tread portion being provided with at least one circumferential groove extending continuously in a tire circumferential direction and at least one lateral groove extending in a tire axial direction,
the at least one lateral groove comprising a connected portion connected to the at least one circumferential groove,
the at least one circumferential groove comprising a groove bottom,
the groove bottom being provided with a plurality of groove bottom protruding portions protruding outwardly in a tire radial direction, and the plurality of groove bottom protruding portions being disposed in only two circumferential rows of the plurality of groove bottom protruding portions that extend in the tire circumferential direction,
each of the plurality of groove bottom protruding portions comprising
  a first surface portion extending in the tire radial direction and facing a first circumferential direction, and
  a second surface portion arranged on a second circumferential direction opposite to the first circumferential direction and extending at a larger angle with respect to the tire radial direction than that of the first surface portion, wherein
in a tread plan view, at least a part of the plurality of groove bottom protruding portions is located in a lateral-groove extended region in which the connected portion is extended into the at least one circumferential groove along the tire axial direction.

2. The tire according to claim 1, wherein
in each of the plurality of groove bottom protruding portions, the first surface portion is continuous with the second surface portion.

3. The tire according to claim 2, wherein
the first surface portion is continuous with the second surface portion through a ridge line extending in the tire axial direction.

4. The tire according to claim 1, wherein
in each of the plurality of groove bottom protruding portions, an angle between the first surface portion and the second surface portion is an acute angle.

TABLE 1

|  | Ref. | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Groove bottom protruding portions | none | presence | presence | presence | presence | presence | presence | presence | presence | presence |
| Groove bottom protruding portion heights h1 (mm) | — | 1.3 | 0.5 | 1.0 | 1.6 | 2.0 | 1.3 | 1.3 | 1.3 | 1.3 |
| Arrangement pitch P1 of groove bottom protruding portions/arrangement pitch P2 of lateral grooves | — | 0.50 | 0.50 | 0.50 | 0.50 | 0.50 | 0.30 | 0.40 | 0.60 | 1.00 |
| On-snow performance (score) | 100 | 110 | 105 | 108 | 111 | 113 | 112 | 110 | 109 | 108 |
| Wet performance (score) | 100 | 98 | 100 | 99 | 96 | 94 | 95 | 97 | 98 | 98 |
| Noise performance (index) | 100 | 92 | 96 | 94 | 92 | 91 | 92 | 92 | 93 | 95 |

5. The tire according to claim 1, wherein
the groove bottom is provided with flat portions between the plurality of groove bottom protruding portions, and the flat portions extend along a ground contacting surface of the tread portion.

6. The tire according to claim 1, wherein
the at least one lateral groove comprises a plurality of lateral grooves arranged in the tire circumferential direction, and
an arrangement pitch of the plurality of groove bottom protruding portions in the tire circumferential direction is smaller than an arrangement pitch of the plurality of lateral grooves.

7. The tire according to claim 1, wherein
at least a part of the first surface portion of one of the plurality of groove bottom protruding portions is located in the lateral-groove extended region.

8. The tire according to claim 1, wherein
the plurality of groove bottom protruding portions comprises a plurality of first groove bottom protruding portions located on a first side in a groove width direction of the at least one circumferential groove, and a plurality of second groove bottom protruding portions located on a second side opposite to the first side in the groove width direction of the at least one circumferential groove.

9. The tire according to claim 8, wherein
the second surface portions of the plurality of first groove bottom protruding portions are inclined in an opposite direction to the second surface portions of the plurality of second groove bottom protruding portions.

10. The tire according to claim 9, wherein
in each of the plurality of groove bottom protruding portions, an angle between the first surface portion and the second surface portion is an acute angle.

11. The tire according to claim 8, wherein
the at least one lateral groove comprises at least one first lateral groove connected to the at least one circumferential groove on the first side, and at least one second lateral groove connected to the at least one circumferential groove on the second side,
at least a part of the plurality of first groove bottom protruding portions is located in a lateral-groove extended region of the at least one first lateral groove, and
at least a part of the plurality of second groove bottom protruding portions is located in a lateral-groove extended region of the at least one second lateral groove.

12. The tire according to claim 11, wherein
the lateral-groove extended region of the at least one second lateral groove overlaps the lateral-groove extended region of the at least one first lateral groove.

13. The tire according to claim 1, wherein
in each of the plurality of groove bottom protruding portions, an angle between the first surface portion and the second surface portion is in a range of 80 to 110 degrees, and
each second surface portion has an angle of 5 to 15 degrees with respect to the tire circumferential direction.

14. The tire according to claim 1, wherein
a height h1 of the plurality of groove bottom protruding portions is in a range of 0.5 to 2.0 mm.

15. The tire according to claim 1, wherein
the at least one lateral groove comprises a plurality of lateral grooves, the groove bottom is provided with a plurality of flat portions each extending parallel to a ground contacting surface of the tread portion,
the plurality of groove bottom protruding portions and the plurality of flat portions are arranged alternately in the tire circumferential direction,
each of the groove bottom protruding portions has a length in the tire circumferential direction in a range of 0.80 to 1.20 times a length in the tire circumferential direction of each of the flat portions, and
an arrangement pitch of a pair of the plurality of groove bottom protruding portions which is directly adjacent in the tire circumferential direction is in a range of 0.40 to 0.60 times an arrangement pitch of a pair of the plurality of lateral grooves which are directly adjacent in the tire circumferential direction.

16. The tire according to claim 15, wherein
in each of the groove bottom protruding portions, the first surface portion is continuous with the second surface portion through a ridge line extending in the tire axial direction, and
the first surface portion includes a curved face region extending from one of the flat portions and a flat face region located between the curved face region and the ridge line.

17. A tire comprising:
a tread portion being provided with at least one circumferential groove extending continuously in a tire circumferential direction,
the at least one circumferential groove comprising a groove bottom being provided with a plurality of groove bottom protruding portions protruding outwardly in a tire radial direction, and the plurality of groove bottom protruding portions being disposed in only two circumferential rows of the plurality of groove bottom protruding portions that extend in the tire circumferential direction,
each of the plurality of groove bottom protruding portions comprising
a first surface portion extending in the tire radial direction and facing a first circumferential direction, and
a second surface portion arranged on a second circumferential direction opposite to the first circumferential direction and extending at a larger angle with respect to the tire radial direction than that of the first surface portion, wherein
in each of the plurality of groove bottom protruding portions, the first surface portion is continuous with the second surface portion,
in each of the plurality of groove bottom protruding portions, an angle between the first surface portion and the second surface portion is an acute angle,
the groove bottom is provided with flat portions between the plurality of groove bottom protruding portions, and
the flat portions extend along a ground contacting surface of the tread portion.

18. The tire according to claim 17, wherein
the plurality of groove bottom protruding portions comprises
a plurality of first groove bottom protruding portions located on a first side in a groove width direction of the at least one circumferential groove, and
a plurality of second groove bottom protruding portions located on a second side opposite to the first side in the groove width direction of the at least one circumferential groove, and the second surface portions of the plurality of first groove bottom protruding portions are inclined in an opposite direction to the second surface portions of the plurality of second groove bottom protruding portions.

\* \* \* \* \*